US009921833B2

(12) United States Patent
Bowman et al.

(10) Patent No.: US 9,921,833 B2
(45) Date of Patent: *Mar. 20, 2018

(54) DETERMINING OF VALIDITY OF SPECULATIVE LOAD DATA AFTER A PREDETERMINED PERIOD OF TIME IN A MULTI-SLICE PROCESSOR

(71) Applicant: International Business Machines Corporation, Armonk, NY (US)

(72) Inventors: Joshua W. Bowman, Austin, TX (US); Sundeep Chadha, Austin, TX (US); Michael J. Genden, Austin, TX (US); Dhivya Jeganathan, Austin, TX (US); Dung Q. Nguyen, Austin, TX (US); David R. Terry, Austin, TX (US); Eula A. Tolentino, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/969,336

(22) Filed: Dec. 15, 2015

(65) Prior Publication Data

US 2017/0168821 A1 Jun. 15, 2017

(51) Int. Cl.
*G06F 9/30* (2006.01)
*G06F 9/38* (2006.01)

(52) U.S. Cl.
CPC ........ *G06F 9/30043* (2013.01); *G06F 9/3001* (2013.01); *G06F 9/30145* (2013.01); *G06F 9/3832* (2013.01); *G06F 9/3836* (2013.01); *G06F 9/3851* (2013.01)

(58) Field of Classification Search
CPC .................................................. G06F 9/30043
See application file for complete search history.

(56) References Cited

U.S. PATENT DOCUMENTS

| 5,541,865 | A | * | 7/1996 | Ashkenazi | .............. | G06F 7/607 |
| | | | | | | 708/210 |
| 5,913,048 | A | | 6/1999 | Cheong et al. | | |
| 2003/0172255 | A1 | * | 9/2003 | Dundas | ................... | G06F 9/383 |
| | | | | | | 712/225 |
| 2004/0078559 | A1 | * | 4/2004 | Katayama | ............. | G06F 9/3017 |
| | | | | | | 712/239 |
| 2005/0097304 | A1 | * | 5/2005 | Luick | .................... | G06F 9/3824 |
| | | | | | | 712/225 |

(Continued)

OTHER PUBLICATIONS

Hilton and Martin, Unit 8 Static and Dynamic Scheduling, Jul. 3, 2010, 41 pages, [retrieved from the internet on Jul. 22, 2017], retrieved from URL <www.cis.upenn.edu/~milom/cis501-Fall09/lectures/08_scheduling.pdf>.*

(Continued)

*Primary Examiner* — Jyoti Mehta
(74) *Attorney, Agent, or Firm* — Brandon C. Kennedy; Robert R. Williams; Kennedy Lenart Spraggins LLP (57) ABSTRACT

Operation of a multi-slice processor that includes a plurality of execution slices and a plurality of load/store slices coupled via a results bus includes: retrieving, from the results bus into an entry of a register file of an execution slice, speculative result data of a load instruction generated by a load/store slice; and determining, from the load/store slice after expiration of a predetermined period of time, whether the result data is valid.

11 Claims, 4 Drawing Sheets

(56) References Cited

U.S. PATENT DOCUMENTS

| | | | |
|---|---|---|---|
| 2007/0106883 A1 | 5/2007 | Choquette | |
| 2007/0186081 A1* | 8/2007 | Chaudhry | G06F 9/30181 |
| | | | 712/214 |
| 2007/0271444 A1* | 11/2007 | Gove | G06F 9/3004 |
| | | | 712/216 |
| 2012/0297170 A1* | 11/2012 | Abdallah | G06F 9/3824 |
| | | | 712/220 |
| 2016/0077836 A1* | 3/2016 | Morrow | G06F 9/3861 |
| | | | 712/227 |

OTHER PUBLICATIONS

Mutlu, Lecture 9 More on precise exceptions, Sep. 30, 2011, 21 pages, [retrieved from the internet on Jul. 24, 2017], retrieved from URL <www.ece.cmu.edu/~ece740/f11/lib/exe/fetch.php?media=wiki:lectures:onur-740-fall11-lecture9-precise-exceptions-ii-afterlecture.pdf>.*

IBM, "Configurable Microprocessor Branch Prediction for Performance and Power Savings", An IP.com Prior Art Database Technical Disclosure (online), Apr. 26, 2004, 5 pages, URL: http://ip.com/IPCOM/000028112.

IBM et al., "Arbitration History Buffer", An IP.com Prior Art Database Technical Disclosure (online), Nov. 1, 1993, 5 pages, URL: http://ip.com/IPCOM/000106491.

ROC920150341US1, Appendix P; List of IBM Patent or Applications Treated as Related, Feb. 29, 2016, 2 pages.

\* cited by examiner

DETERMINING OF VALIDITY OF SPECULATIVE LOAD DATA AFTER A PREDETERMINED PERIOD OF TIME IN A MULTI-SLICE PROCESSOR

BACKGROUND OF THE INVENTION

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY OF THE INVENTION

Methods and apparatus for operation of a multi-slice processor are disclosed in this specification. Such a multi-slice processor includes a plurality of execution slices and a plurality of load/store slices, where the load/store slices are coupled to the execution slices via a results bus. Operation of such a multi-slice processor includes: retrieving, from the results bus into an entry of a register file of an execution slice, speculative result data of a load instruction generated by a load/store slice; and determining, from the load/store slice after expiration of a predetermined period of time, whether the result data is valid.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
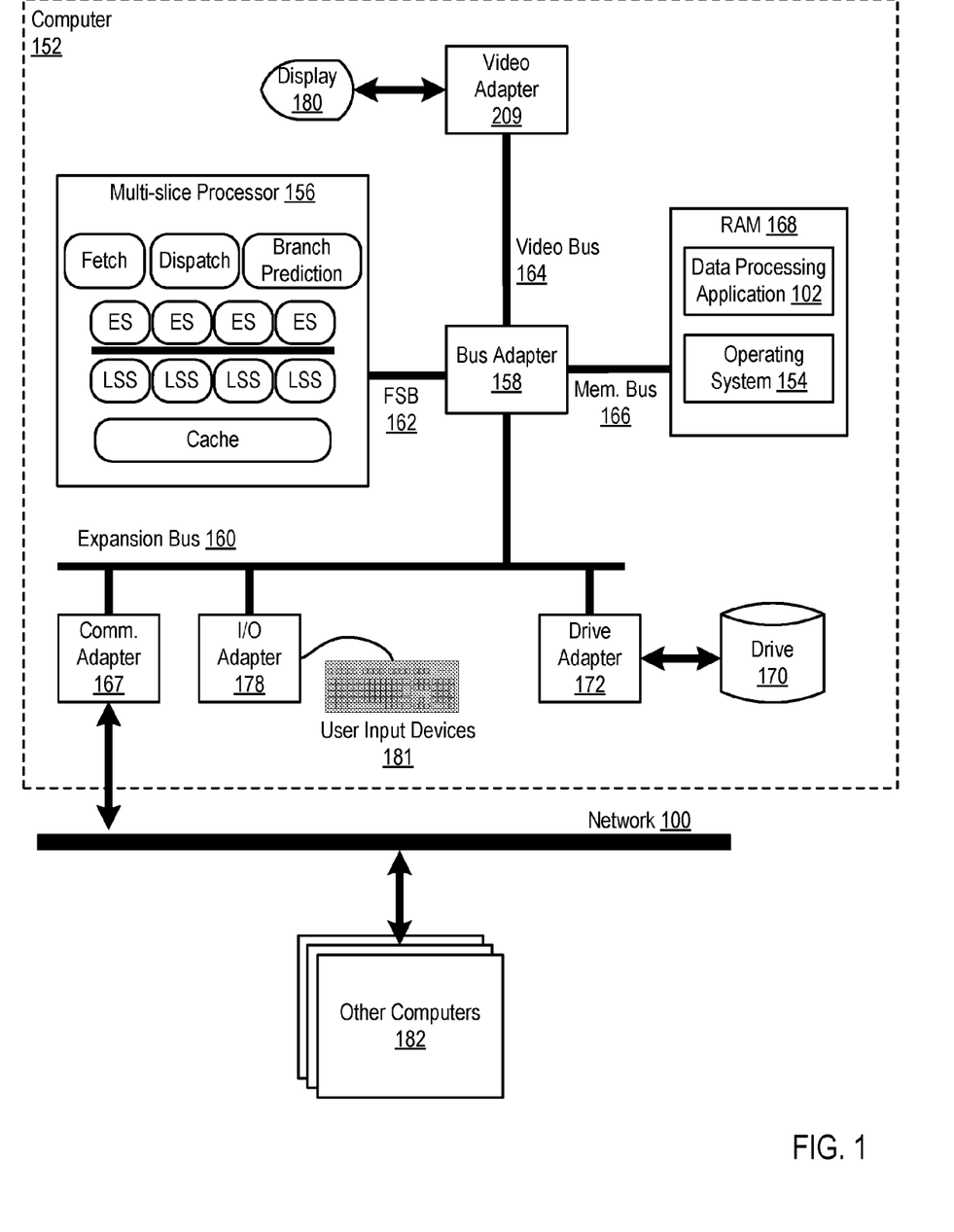
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
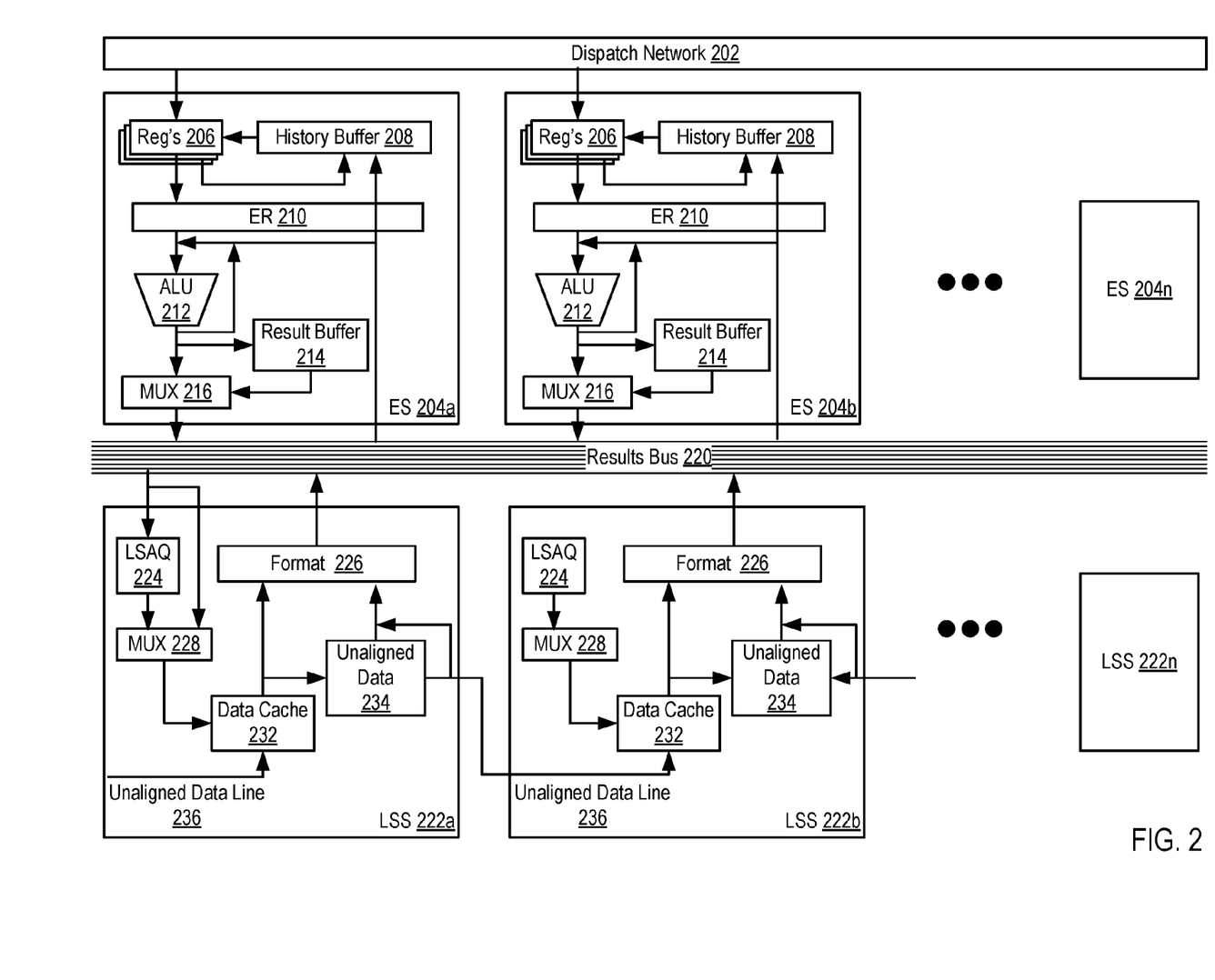
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction directed to a particular logical register and the result of the execution of the instruction. A logical register is an abstraction of a physical register that enables out-of-order execution of instructions that target the same physical register.

When a younger instruction directed to the same particular logical register is received, the entry in the general purpose register is moved to the history buffer. The history buffer (208) may be configured to store many instructions directed to the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
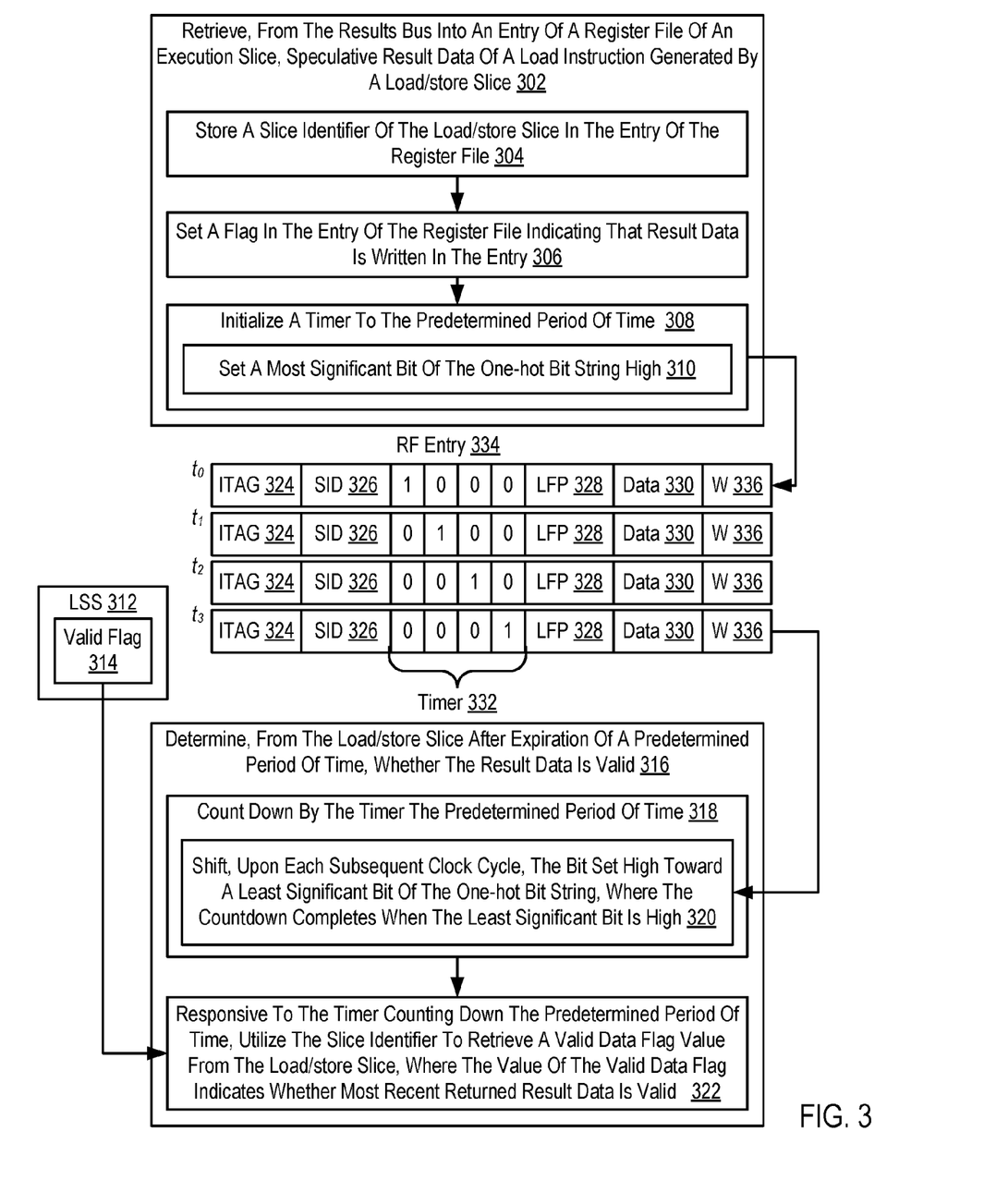
FIG. 3 sets forth a flow chart illustrating an exemplary method of operation of a multi-slice processor.

For further explanation, FIG. 3 sets forth a flow chart illustrating an exemplary method of operation of a multi-slice processor. The steps depicted in the method of FIG. 3 may be carried out by a multi-slice processor similar to that in the example of FIG. 2. Such a multi-slice processor may include a plurality of execution slices and a plurality of load/store slices, where the load/store slices are coupled to the execution slices via a results bus.

The method of FIG. 3 includes retrieving (302), from the results bus into an entry (334) of a register file of an execution slice, speculative result data (330) of a load instruction generated by a load/store slice (312). The register file may be a general purpose register configured to hold the youngest instruction targeting a logical register, with each entry in the general purpose register representing a different logical register. Alternatively, the register file may be a history buffer in which each entry holds an instruction targeting a logical register that is not the youngest instruction targeting that logical register. When an instruction is received that targets a logical register and an instruction is presently stored in the general purpose register that also targets that logical register, the instruction stored in the general purpose register is evicted to the history buffer.

The term 'speculative result data' refers to data returned by a load/store slice to an execution unit as a result of a load instruction prior to confirming by the load/store slice that the data returned is valid data. Such speculative result data may be returned prior to the confirmation of data validity by retrieving the data from a cache line of the load/store slice prior to the load/store slice checking the status flags of the cache line. Such status flags may indicate that the data in the cache is valid or dirty, and so on. Confirming that such data is not speculative may take up to a predetermined period of time.

In the method of FIG. 3, retrieving (302) speculative result data of a load instruction from the results bus may include storing (304) a slice identifier (326) of the load/store slice (312) in the entry (334) of the register file; setting (306) a flag (336) in the entry of the register file indicating that result data is written in the entry; and initializing (308) a timer (332) in the entry to the predetermined period of time. The execution slice may also set a flag (328) indicating that a load finish is pending.

In some embodiments, each load/store slice is coupled to a different, single line of the results bus. As such, each bus line may represent a particular slice. Storing (304) a slice identifier (326) of the load/store slice (312) in the entry (334) of the register file may be carried out by determining the bus line the result data was retrieved from and store the slice identifier associated with that bus line in the entry. In other embodiments, the load/store slice may broadcast, along with the result data, the slice identifier of the load/store slice.

In the method of FIG. 3, initializing (308) the timer may include setting (310) a most significant bit of the one-hot bit string high. That is, the timer may be implemented as a set of bits, one bit for each cycle that occurs while the load/store slice is determining whether the data provided as a result is speculative or valid. Consider, for example, that the load/store slice takes four clock cycles to determine validity of the speculative data provided to the execution slice as a result of a load instruction. In such an embodiment, the one-hot bit string may be implemented as with 4-bits. Initializing the timer in such an embodiment may be carried out by setting the most significant bit of that bit string high. The countdown proceeds by shifting the high bit one bit each clock cycle toward the least significant bit. In the example of FIG. 3, the one-hot bit string timer (332) of the register file entry (334) proceeds through four clock cycles as follows:

a. $t_{0:\ 1000}$
b. $t_{0:\ 0100}$
c. $t_{0:\ 0010}$
d. $t_{0:\ 0001}$

Readers of skill in the art will recognize that many other timers may be implemented to track the predetermined amount of time that it takes for the load/store slice to confirm validity of the speculative data. For example, a similar timer as that described above may be implemented in which the one-hot bit string may be initialized by setting the least significant bit high and shifting the high bit by one bit, each clock cycle, toward the most significant bit. In other embodiments, all bits of the bit string may be set high, and upon each clock cycle, a different one of the bits may be set low until all are set low. The inverse (high for low and low for high) may be implemented as well. Further, the timer need not be implemented in the entry itself, but may be implemented in other components of a multi-slice processor including a counter facility or the like.

The method of FIG. 3 also includes determining (316), from the load/store slice after expiration of a predetermined period of time, whether the result data is valid. In the method of FIG. 3, determining (316) whether the result data is valid is carried out by counting down (318) by the timer (332) the predetermined period of time and, responsive to the timer counting down the predetermined period of time, utilizing (322) the slice identifier (326) to retrieve a valid data flag (314) value from the load/store slice. The value of the valid data flag indicates whether most recent returned result data is valid. That is, once the load/store slice determines whether the data is valid, the load/store slice sets the value of the valid flag (314) accordingly. In some embodiments, the load/store slice may broadcast the flag along with the instruction identifier of the load instruction on the results bus and the execution slice may retrieve the valid flag from the bus by snooping the instruction identifier (324) on the results bus line for the slice identifier of the load/store slice. In some embodiments, the execution slice may query or directly retrieve the valid flag from the load/store slice through use of the slice identifier.

As mentioned above, counting down (318) by the timer the predetermined period of time may be carried out, in some embodiments, by shifting (320), upon each subsequent clock cycle, the bit set high toward a least significant bit of the one-hot bit string. The countdown completes when the least significant bit is high.

If the data is determined to be not valid, the execution slice may clear the flag (336) in the entry of the register file indicating whether result data is written in the entry. In this way, source instructions having as its source the logical register of the load instruction will not utilize the invalid data. If the data is determined to be valid, the execution slice may clear the load finish pending flag and keep the flag indicating data written into the entry set. In this way, each source instruction having as its source the logical register of the load instruction may utilize the valid data stored in the entry.

Figure 4:
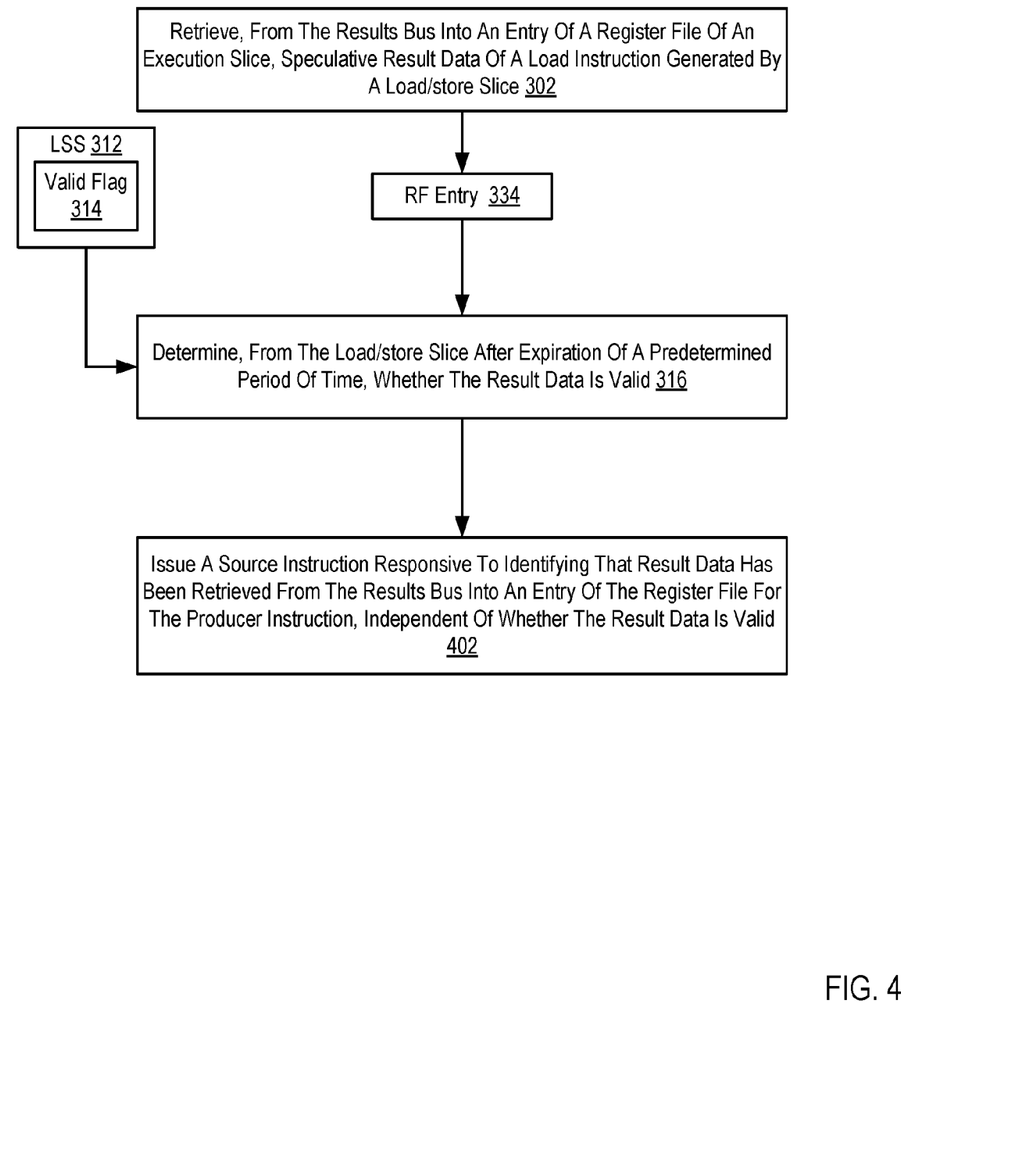
FIG. 4 sets forth a flow chart illustrating a further exemplary method of operation of a multi-slice processor according to embodiments of the present invention.

For further explanation, FIG. 4 sets forth a flow chart illustrating a further exemplary method of operation of a multi-slice processor according to embodiments of the present invention. The method of FIG. 4 is similar to the method of FIG. 3 in that the method of FIG. 4 may also be carried out by a multi-slice processor similar to that of FIG. 2 and the method of FIG. 4 includes retrieving (302), from the results bus into an entry (324) of a register file of an execution slice, speculative result data of a load instruction generated by a load/store slice (312); and determining (316), from the load/store slice after expiration of a predetermined period of time, whether the result data is valid.

The method of FIG. 4, however, differs from the method of FIG. 3 in that the method of FIG. 4 also includes in the method of FIG. 4, an entry in an issue queue includes a source instruction, where the source instruction is dependent upon results of a producer instruction and the producer instruction is a load instruction. To that end, the method of FIG. 4 includes issuing (402) the source instruction responsive to identifying that result data has been retrieved from the results bus into an entry of the register file for the producer instruction, independent of whether the result data is valid. That is, upon the flag (336 in FIG. 3) in the producer instruction's entry indicating whether data has been received as a result is set, the issue queue may issue the source instruction. Here, the issue queue does not wait until the data has been confirmed valid.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A multi-slice processor comprising:
a plurality of execution slices; and
a plurality of load/store slices, wherein the plurality of load/store slices are coupled to the plurality of execution slices via a results bus and an execution slice of the plurality of execution slices is configured to:
retrieve, from the results bus into an entry of a register file in the execution slice, speculative result data of a load instruction, the speculative load data generated by a load/store slice, the retrieving including: storing a slice identifier of the load/store slice in the entry of the register file, setting a flag in the entry of the register file indicating that result data is written in the entry, and initializing a timer in the entry to a predetermined period of time; and
determine, from the load/store slice after expiration of the predetermined period of time, whether the speculative result data is valid, the determining including: counting down by the timer the predetermined period of time; and utilizing the slice identifier to retrieve a valid data flag value from the load/store slice responsive to the timer counting down the predetermined period of time, wherein the valid data flag value indicates whether most recent returned result data is valid.

2. The multi-slice processor of claim 1 wherein:
the timer comprises a one-hot bit string;
initializing the timer comprises setting a most significant bit of the one-hot bit string high; and
counting down by the timer the predetermined period of time comprises shifting, upon each subsequent clock cycle, the bit set high toward a least significant bit of the one-hot bit string, wherein the counting down by the timer completes when the least significant bit is high.

3. The multi-slice processor of claim 1 further comprising an issue queue, wherein:
an entry in the issue queue includes a source instruction, wherein the source instruction is dependent upon results of a producer instruction and the producer instruction is a load instruction; and
the issue queue is configured to:
issue the source instruction responsive to the execution slice identifying that result data has been retrieved from the results bus into an entry of the register file for the producer instruction, independent of whether the retrieved result data for the producer instruction is valid.

4. The multi-slice processor of claim 1 wherein the register file comprises a general purpose register.

5. The multi-slice processor of claim 1 wherein the register file is a history buffer.

6. The multi-slice processor of claim 1 wherein each execution slice includes an instruction queue, a general purpose register, a history buffer, and an arithmetic execution unit, wherein each execution slice is associated with a load-store slice to form a single slice of the multi-slice processor.

7. An apparatus comprising:
a multi-slice processor that includes a plurality of execution slices and a plurality of load/store slices, wherein the plurality of load/store slices are coupled to the plurality of execution slices via a results bus; and
a computer memory operatively coupled to the multi-slice processor, wherein an execution slice of the plurality of execution slices is configured to:
retrieve, from the results bus into an entry of a register file in the execution slice, speculative result data of a load instruction, the speculative result data generated by a load/store slice, the retrieving including: storing a slice identifier of the load/store slice in the entry of the register file, setting a flag in the entry of the register file indicating that result data is written in the entry, and initializing a timer in the entry to a predetermined period of time; and
determine, from the load/store slice after expiration of the predetermined period of time, whether the speculative result data is valid, the determining including: counting down by the timer the predetermined period of time; and utilizing the slice identifier to retrieve a valid data flag value from the load/store slice responsive to the timer counting down the predetermined period of time, wherein the valid data flag value indicates whether most recent returned result data is valid.

8. The apparatus of claim 7 wherein:
the timer comprises a one-hot bit string;
initializing the timer comprises setting a most significant bit of the one-hot bit string high; and counting down by the timer the predetermined period of time comprises shifting, upon each subsequent clock cycle, the bit set high toward a least significant bit of the one-hot bit string, wherein the counting down by the timer completes when the least significant bit is high.

9. The apparatus of claim 7 wherein:

the multi-slice processor further includes an issue queue;

an entry in the issue queue includes a source instruction, wherein the source instruction is dependent upon results of a producer instruction and the producer instruction is a load instruction; and the issue queue is configured to:
  issue the source instruction responsive to the execution slice identifying that result data has been retrieved from the results bus into an entry of the register file for the producer instruction, independent of whether the retrieved result data for the producer instruction is valid.

10. The apparatus of claim 7 wherein the register file comprises a general purpose register.

11. The apparatus of claim 7 wherein the register file is a history buffer.

\* \* \* \* \*